United States Patent
Kim et al.

(10) Patent No.: US 12,337,814 B2
(45) Date of Patent: Jun. 24, 2025

(54) ELECTRO-MECHANICAL BRAKE

(71) Applicant: HYUNDAI MOBIS Co., Ltd., Seoul (KR)

(72) Inventors: Jong Sung Kim, Seoul (KR); Geun Soo Choi, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 253 days.

(21) Appl. No.: 17/885,928

(22) Filed: Aug. 11, 2022

(65) Prior Publication Data
US 2023/0051407 A1 Feb. 16, 2023

(30) Foreign Application Priority Data
Aug. 11, 2021 (KR) .................. 10-2021-0106302

(51) Int. Cl.
*B60T 8/92* (2006.01)
*B60T 7/04* (2006.01)
*B60T 8/88* (2006.01)

(52) U.S. Cl.
CPC .............. *B60T 8/92* (2013.01); *B60T 7/042* (2013.01); *B60T 8/885* (2013.01); *B60T 2220/04* (2013.01); *B60T 2270/402* (2013.01); *B60T 2270/404* (2013.01); *B60T 2270/413* (2013.01); *B60T 2270/414* (2013.01); *B60T 2270/82* (2013.01)

(58) Field of Classification Search
CPC . B60T 8/92; B60T 7/042; B60T 8/885; B60T 2220/04; B60T 2270/402; B60T 2270/404; B60T 2270/413; B60T 2270/414; B60T 2270/82; B60T 13/662; B60T 17/221; B60T 8/172; B60T 13/74; B60R 16/023; B60R 16/033; B60Y 2306/15
See application file for complete search history.

(56) References Cited

U.S. PATENT DOCUMENTS 6,157,887 A * 12/2000 Zittlau .................. B60T 13/741
303/122.04
6,345,225 B1 * 2/2002 Bohm .................... B60T 8/321
701/72

(Continued)

*Primary Examiner* — James M McPherson
*Assistant Examiner* — Kyle J Kingsland
(74) *Attorney, Agent, or Firm* — Morgan, Lewis & Bockius LLP

(57) ABSTRACT

An electro-mechanical brake includes: first to third pedal sensors detecting a stroke of a brake pedal to generate first to third braking signals, respectively, the third pedal sensor including an auxiliary control unit; wheel control units attached to wheels, respectively; a first central control unit configured to receive the first braking signal to calculate a first desired braking intensity, and to transmit a first desired braking intensity signal related to the first desired braking intensity to the wheel control units; a second central control unit configured to receive the second braking signal to calculate a second desired braking intensity, and to transmit the second desired braking intensity signal to the wheel control units; and a first Controller Area Network (CAN) communications unit configured to transmit a signal between the auxiliary control unit, the first central control unit, the second central control unit, and the wheel control units.

9 Claims, 2 Drawing Sheets

(56) References Cited

U.S. PATENT DOCUMENTS

| | | | | |
|---|---|---|---|---|
| 2002/0158511 A1* | 10/2002 | Baumgartner | .......... | B60T 8/368 303/199 |
| 2011/0320099 A1* | 12/2011 | Kim | ..................... | B60T 13/746 701/70 |
| 2023/0202435 A1* | 6/2023 | Schmidt | ................... | B60T 7/12 701/70 |

* cited by examiner

ELECTRO-MECHANICAL BRAKE

CROSS-REFERENCE TO RELATED APPLICATIONS

This application is based on, and claims priority from, Korean Patent Application Number 10-2021-0106302, filed on Aug. 11, 2021, the disclosure of which is incorporated by reference herein in its entirety.

TECHNICAL FIELD

The present disclosure relates to an electro-mechanical brake.

BACKGROUND

The content described in this section merely provides the background information on the present disclosure and does not constitute the prior art.

An electro-mechanical brake (EMB) is configured by converting a conventional hydraulic brake into a mechanical structure that does not require brake fluid. In the electro-mechanical brake, an electric motor installed on each wheel directly applies force to generate a braking force.

As compared to the hydraulic brake, the electro-mechanical brake is simpler in structure, is faster in braking response speed, and enables more precise control, thus improving braking stability. In the EMB, an actuator driven by a motor is mounted on a brake caliper, so that a braking force is generated by pressing a piston using a mechanism such as a screw without a medium such as brake fluid.

In a brake by wire (BBW) system such as the EMB, a pedal sensor detects the stroke of a brake pedal to determine a driver's braking intention. If the braking signal is transmitted to the central control unit, the central control unit calculates a desired braking intensity to drive each actuator. The central control unit determines all braking—related requests such as an Anti-Lock Brake System (ABS), a Traction Control System (TCS), or an Electronic Stability Control System (ESC), and transmits the related signal to a wheel control unit mounted on each actuator to generate a braking force.

The EMB system has a plurality of central control units and a plurality of wheel control units, and has a redundancy design in the form of a back-up brake means in the event of the failure of a main brake means. However, the conventional EMB system is problematic in that the wheel control unit may generate the braking force of each wheel only after it should receive a braking signal using the central control unit, and the back-up brake may not be performed only by the wheel control unit. In other words, when a plurality of central control units are out of order, the braking signal may not be transmitted to the wheel control unit and thus the back-up brake is not performed.

SUMMARY

According to at least one embodiment, the present disclosure provides an electro-mechanical brake comprising: a first pedal sensor detecting a stroke of a brake pedal to generate a first braking signal; a second pedal sensor detecting the stroke of the brake pedal to generate a second braking signal; a third pedal sensor detecting the stroke of the brake pedal to generate a third braking signal, and comprising an auxiliary control unit; a plurality of wheel control units attached to a plurality of wheels, respectively, to control the wheels; a first central control unit configured to receive the first braking signal to calculate a first desired braking intensity, and to transmit a first desired braking intensity signal related to the first desired braking intensity to the plurality of wheel control units; a second central control unit configured to receive the second braking signal to calculate a second desired braking intensity, and to transmit the second desired braking intensity signal to the plurality of wheel control units; and a first Controller Area Network (CAN) communications unit configured to transmit a signal between the auxiliary control unit, the first central control unit, the second central control unit, and the plurality of wheel control units.

DETAILED DESCRIPTION

Figure 1:
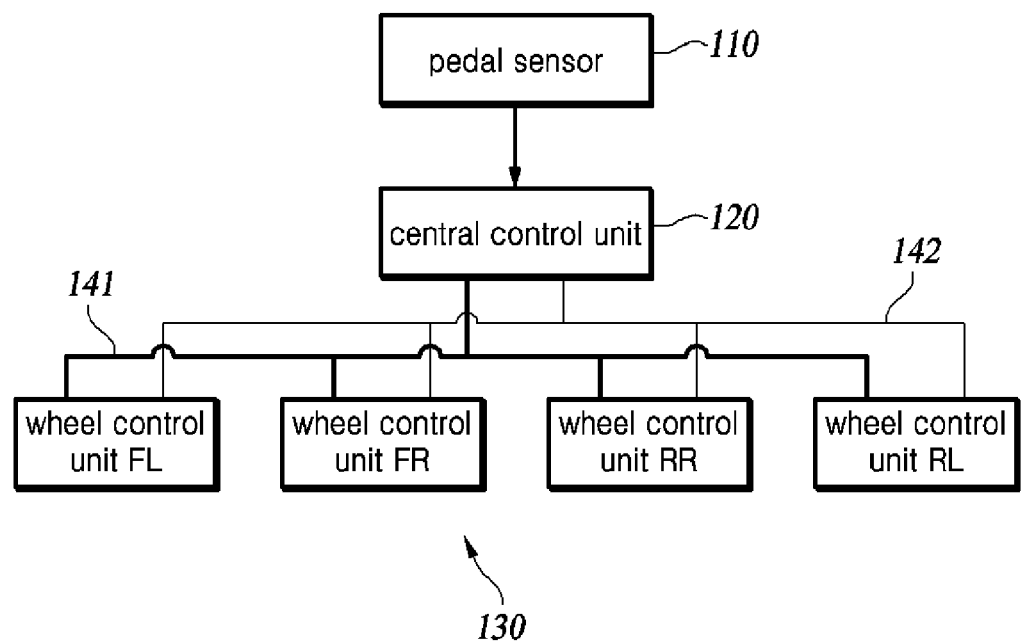
FIG. 1 is a block diagram showing the configuration of an electro-mechanical brake according to an embodiment of the present disclosure.

In view of the above, the present disclosure provides an electro-mechanical brake, in which a braking signal is directly transmitted to a wheel control unit using a pedal sensor including an auxiliary control unit in the event of the failure of a central control unit, so that a braking force can be generated only by the wheel control unit.

The problems to be solved by the present disclosure are not limited to the above-mentioned problems, and other problems which are not mentioned will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit,' 'module,' and the like refer to one or more units for processing at least one function or operation, which may be implemented by hardware, software, or a combination thereof.

FIG. 1 is a block diagram showing the configuration of an electro-mechanical brake according to an embodiment of the present disclosure.

Referring to FIG. 1, the electro-mechanical brake 100 may include all or some of a plurality of pedal sensors 110, a plurality of central control units 120, a plurality of wheel control units 130, and a CAN communications unit (Controller Area Network communications unit).

The pedal sensor 110 transmits a driver's braking intention to the central control unit 120. If the driver steps on a brake pedal, the pedal sensor 110 recognizes it and transmits a pedal sensor signal to the central control unit 120. The pedal sensor signal generated by the driver's braking intention is hereinafter referred to as a 'braking signal'.

The central control unit 120 receives the braking signal from the pedal sensor 110. The central control unit 120 may calculate the desired braking intensity of each of a plurality of wheels using the braking signal. The central control unit 120 may transmit a signal about the desired braking intensity of each of the plurality of wheels to each of the wheel control units 130. Here, each of the central control units 120 and the wheel control units 130 may be an Electronic Control Unit (ECU). The central control unit 120 may transmit the signal about the desired braking intensity (hereinafter referred to as a 'desired braking intensity signal') to each of the wheel control units 130 using the CAN communications unit. However, without being limited to the CAN communication, communication protocols of other specifications such as FlexRay may also be applied.

The CAN communication is a standard communication standard in which a plurality of ECUs are connected in parallel to communicate with each other without a host computer in a vehicle. The CAN communication is a message-based communication protocol.

The wheel control units 130 may be mounted on a front left (FL) wheel, a front right (FR) wheel, a rear left (RL) wheel, and a rear right (RR) wheel of the vehicle, respectively. Each of the plurality of wheel control units 130 may control the braking of each wheel based on the signal about the desired braking intensity received from each central control unit 120.

Referring to FIG. 1, the CAN communications unit of the electro-mechanical brake may include a first CAN communications unit 141 and a second CAN communications unit 142. Each of the first CAN communications unit 141 and the second CAN communications unit 142 may be local CAN communication.

The central control unit 120 receives the braking signal to calculate the desired braking intensity, and transmits the desired braking intensity signal to each wheel control unit 130 using the CAN communication. If a problem occurs in the CAN communication when the central control unit 120 transmits the desired braking intensity signal to the wheel control unit 130, it is impossible to transmit the desired braking intensity signal to all of the plurality of wheel control units 30. Therefore, each of the first CAN communications unit 141 and the second CAN communications unit 142 may have a redundancy configuration.

Referring to FIG. 1, the first CAN communications unit 141 may connect the central control unit 120 and the plurality of wheel control units 130 to transmit the signal therebetween. The second CAN communications unit 142 may connect the central control unit 120 and the plurality of wheel control units 130 to transmit the signal therebetween. When a problem occurs in the first CAN communications unit 141, the central control unit 120 may transmit the desired braking intensity signal to the plurality of wheel control units 130 using the second CAN communications unit 142. When a problem occurs in the second CAN communications unit 142, the central control unit 120 may transmit the desired braking intensity signal to the plurality of wheel control units 130 using the first CAN communications unit 141.

Figure 2:
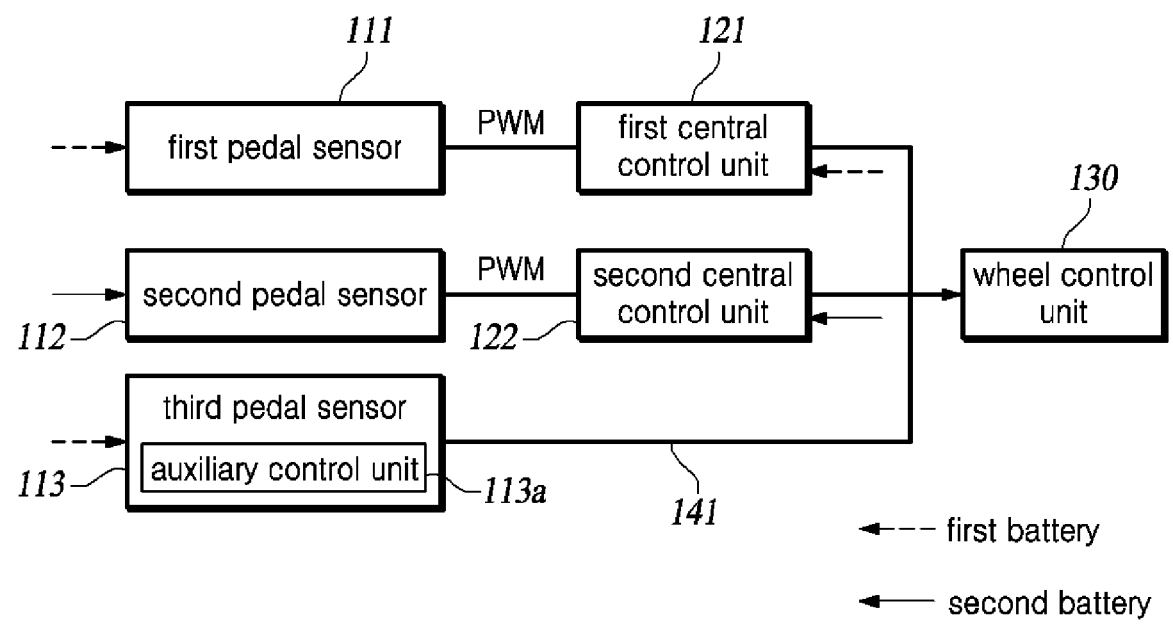
FIG. 2 is a block diagram showing a method of transmitting a signal from a pedal sensor of the electro-mechanical brake to a central control unit according to an embodiment of the present disclosure.

FIG. 2 is a block diagram showing a method of transmitting the signal from the pedal sensor of the electro-mechanical brake to the central control unit according to an embodiment of the present disclosure.

Referring to FIG. 2, the electro-mechanical brake 100 may include all or some of a first pedal sensor 111, a second pedal sensor 112, a third pedal sensor 113, a first central control unit, a second central control unit 122, and a wheel control unit 130.

The first pedal sensor 111 detects a pedal stroke of the brake pedal to generate a first braking signal. The second pedal sensor 112 detects a pedal stroke of the brake pedal to generate a second brake signal. The third pedal sensor 113 detects a pedal stroke of the brake pedal to generate a third brake signal. When a problem occurs in one of the first to third braking signals, the central control unit 120 compares the first to third braking signals to determine a normal signal based on the principle of majority rule. When the central control unit 120 compares the first to third braking signals, it may be determined that a braking signal different from the remaining two braking signals is abnormal. The central control unit 120 may determine that a braking signal deviating from an error range compared to the remaining two braking signals among the first to third braking signals is abnormal.

The first pedal sensor 111 transmits the first braking signal to the first central control unit 121. The first braking signal may be a Pulse Width Modulation (PWM) signal or an analog signal. The first central control unit 121 receives the first braking signal to calculate the desired braking intensity, and transmits the signal about the desired braking intensity to each wheel control unit 130 using the first CAN communications unit 141.

The second pedal sensor 112 transmits the second braking signal to the second central control unit 122. The second braking signal may be a PWM signal or an analog signal. The second central control unit 122 receives the second braking signal to calculate the desired braking intensity, and transmits the signal about the desired braking intensity to each wheel control unit 130 using the first CAN communications unit 141.

The third pedal sensor 113 may include an auxiliary control unit 113a. The third pedal sensor 113 directly transmits the third braking signal to each wheel control unit 130. The third pedal sensor 113 may be connected to the first CAN communications unit 141 using the auxiliary control unit 113a. Each wheel control unit 130 may receive the third braking signal using the first CAN communications unit 141, and may directly calculate the desired braking intensity.

The first CAN communications unit 141 may be configured to transmits a signal between the first central control unit 121, the second central control unit 122, the auxiliary control unit 113a, and the plurality of wheel control units 130. The first central control unit 121, the second central control unit 122, and the auxiliary control unit 113a may exchange information with each other using the first CAN communications unit 141. In other words, the first braking signal may be transmitted to the first central control unit 121 as well as the second central control unit 122 and the auxiliary control unit 113a using the first CAN communications unit 141. The second braking signal may be transmitted to the second central control unit 122 as well as the first central control unit 121 and the auxiliary control unit 113a using the first CAN communications unit 141. The third braking signal may be transmitted to the auxiliary control unit 113a as well as the first central control unit 121 and the second central control unit 122 using the first CAN communications unit 141.

When it is determined that an error has occurred in the first central control unit 121, the second central control unit 122 receives the second braking signal to calculate the desired braking intensity, and transmits the signal about the desired braking intensity to each wheel control unit 130 using the first CAN communications unit 141.

When it is determined that an error has occurred in the second central control unit 122, the first central control unit 121 receives the first braking signal to calculate the desired braking intensity, and transmits the signal about the desired braking intensity to each wheel control unit 130 using the first CAN communications unit 141.

When it is determined that errors have occurred in the first central control unit 121 and the second central control unit 122, the auxiliary control unit 113a transmits the third braking signal to each wheel control unit 130. Each wheel control unit 130 may receive the third braking signal using the first CAN communications unit 141, and may directly calculate the desired braking intensity.

Referring to FIG. 2, the electro-mechanical brake 100 may include a first battery and a second battery.

The first battery may supply power to the first pedal sensor 111, the third pedal sensor 113, and the first central control unit 121. The second battery may supply power to the second pedal sensor 112 and the second central control unit 122.

The first battery and the second battery may have a redundancy configuration. When a failure occurs in the first battery, the first pedal sensor 111, the third pedal sensor 113, and the first central control unit 121 may not be normally operated. In the case where the first pedal sensor 111, the third pedal sensor 113, and the first central control unit 121 are not operated normally, the second pedal sensor 112 and the second central control unit 122 may be used. The wheel control unit 130 may be controlled by transmitting the braking signal to the wheel control unit 130 using the second pedal sensor 112 and the second central control unit 122.

When a failure occurs in the second battery, the second pedal sensor 112 and the second central control unit 122 may not be normally operated. In the case where the second pedal sensor 112 and the second central control unit 122 are not operated normally, the first pedal sensor 111, the third pedal sensor 113, and the first central control unit 121 may be used. The wheel control unit 130 may be controlled by transmitting the braking signal to the wheel control unit 130 using the first pedal sensor 111, the third pedal sensor 113, and the first central control unit 121.

The electro-mechanical brake 100 according to an embodiment of the present disclosure may implement a triple redundancy by using the wheel control unit 130 as a back-up brake means. The triple redundancy is not legally enforced. However, by implementing the triple redundancy, it is possible to increase the reliability of the electro-mechanical brake 100 and secure price competitiveness. However, since the CAN communications unit and the battery are lower in error occurrence probability than the control unit such as the central control unit 120, the wheel control unit 130, or the auxiliary control unit 113a, it has a redundancy configuration.

According to an embodiment, an electro-mechanical brake is advantageous in that a braking signal is directly transmitted to a wheel control unit using a pedal sensor including an auxiliary control unit in the event of the failure of a central control unit, thus being capable of performing back-up brake even when the central control unit is out of order. Further, the reliability and stability of the electro-mechanical brake can be improved.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electro-mechanical brake comprising:
a first pedal sensor detecting a stroke of a brake pedal to generate a first braking signal;
a second pedal sensor detecting the stroke of the brake pedal to generate a second braking signal;
a third pedal sensor detecting the stroke of the brake pedal to generate a third braking signal, and comprising an auxiliary control unit;
a plurality of wheel control units attached to a plurality of wheels, respectively, to control the wheels;
a first central control unit, a unit independent from the first pedal sensor, configured to receive one or more of a Pulse Width Modulation (PWM) signal or an analog signal corresponding to the first braking signal to calculate a first desired braking intensity, and to transmit a first desired braking intensity signal related to the first desired braking intensity to the plurality of wheel control units;
a second central control unit, a unit independent from the second pedal sensor, configured to receive one or more of a PWM signal or an analog signal corresponding to the second braking signal to calculate a second desired braking intensity, and to transmit the second desired braking intensity signal to the plurality of wheel control units; and
a first Controller Area Network (CAN) communications unit configured to transmit a signal between the auxiliary control unit, the first central control unit, the second central control unit, and the plurality of wheel control units,
wherein the first braking signal is generated based on the stroke of the brake pedal detected only by the first pedal sensor among the first to third pedal sensors, the second braking signal is generated based on the stroke of the brake pedal detected only by the second pedal sensor among the first to third pedal sensors, and the third braking signal is generated based on the stroke of the brake pedal detected only by the third pedal sensor among the first to third pedal sensors, and
wherein the third pedal sensor including the auxiliary control unit is configured to directly transmit the third braking signal to the plurality of wheel control units such that the plurality of wheel control units are configured to directly calculate a desired braking intensity, when it is determined that an error occurs in the first central control unit and the second central control unit.

2. The electro-mechanical brake of claim 1, further comprising:
a second CAN communications unit configured to transmit a signal between the first central control unit, the second central control unit, and the plurality of wheel control units, when an error occurs in the first CAN communications unit.

3. The electro-mechanical brake of claim 1, wherein the second central control unit is configured to receive the second braking signal and thereby calculate the second desired braking intensity, and to transmit a signal about the second desired braking intensity to the plurality of wheel control units, when it is determined that an error occurs in the first central control unit.

4. The electro-mechanical brake of claim 1, wherein the first central control unit further receives the second braking signal and the third braking signal, and
the first central control unit compares the first to third braking signals, and determines a majority of braking signals among the first to third braking signals as a normal signal.

5. The electro-mechanical brake of claim 1, wherein the second central control unit further receives the first braking signal and the third braking signal, and
the second central control unit compares the first to third braking signals, and determines a majority of braking signals among the first to third braking signals as a normal signal.

6. The electro-mechanical brake of claim 1, further comprising:
a plurality of batteries configured to supply power to the first to third pedal sensors, the first central control unit, and the second central control unit.

7. The electro-mechanical brake of claim 6, wherein the plurality of batteries comprise:
a first battery configured to supply power to the first pedal sensor, the third pedal sensor, and the first central control unit; and
a second battery configured to supply power to the second pedal sensor and the second central control unit.

8. The electro-mechanical brake of claim 7, wherein the first battery is configured to supply power to the first pedal sensor, the third pedal sensor, and the first central control unit, when an error occurs in the second battery.

9. The electro-mechanical brake of claim 7, wherein the second battery is configured to supply power to the second pedal sensor and the second central control unit, when an error occurs in the first battery.

* * * * *